United States Patent [19]

Mari

[11] Patent Number: 5,349,158
[45] Date of Patent: Sep. 20, 1994

[54] TORCH FOR CONTINUOUS-WIRE ELECTRIC WELDING MACHINES, GAS- OR WATER-COOLED

[76] Inventor: Antonio Mari, Via del Fresatore 1, Bologna, Italy

[21] Appl. No.: 947,476

[22] Filed: Sep. 21, 1992

[30] Foreign Application Priority Data

Sep. 25, 1991 [IT] Italy .................... GE91U000043

[51] Int. Cl.$^5$ .................................... B23K 9/173
[52] U.S. Cl. .................................... 219/137.62
[58] Field of Search ................ 219/137.31, 137.62

[56] References Cited

U.S. PATENT DOCUMENTS

| | | | |
|---|---|---|---|
| 3,265,856 | 8/1966 | Cecil | 219/137.31 |
| 4,158,763 | 6/1979 | Moerke | 219/137.62 |
| 4,313,046 | 1/1982 | Henry et al. | 219/137.62 |
| 4,864,099 | 9/1989 | Cusik, III et al. | 219/137.62 |
| 4,916,270 | 4/1990 | West et al. | 219/137.31 |

*Primary Examiner*—Clifford C. Shaw
*Attorney, Agent, or Firm*—Larson and Taylor

[57] ABSTRACT

The torch body terminates with a stepped, outwardly-decreasing cross section which, beginning from the innermost portion, comprises a collar (2) of polygonal or equivalent shape and, thereafter, a cylindrical portion of round cross section (3) and a threaded end portion (4) having screwed thereon the gas-diffusing nozzle (9), which is provided, preferably, with unscrewing-preventing means (10—10') and which firmly mounts a bush (12) of rigid plastics or other suitable material for protection of said nozzle and of a portion of the wire-guiding spout (11) which is screwed on said nozzle. The nozzle (9) locks in the axial direction the parts lining surrounding said cylindrical and cooled portion (3) of the torch body, the outermost portion (7) of them being preferably of metal, being coupled at an end to said collar (2) with the interposition of an insert (6-30) of insulating material, and the latter portion (7) having frictionally fitted thereon a resiliently-clamping end portion of a metallic housing (13) which surrounds and protects said nozzle and wire-guiding spout.

11 Claims, 2 Drawing Sheets

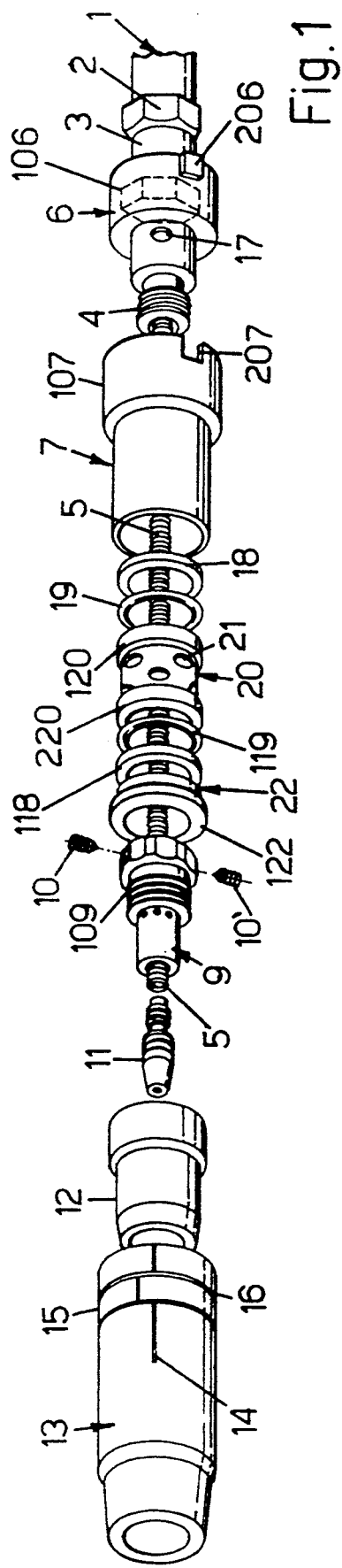
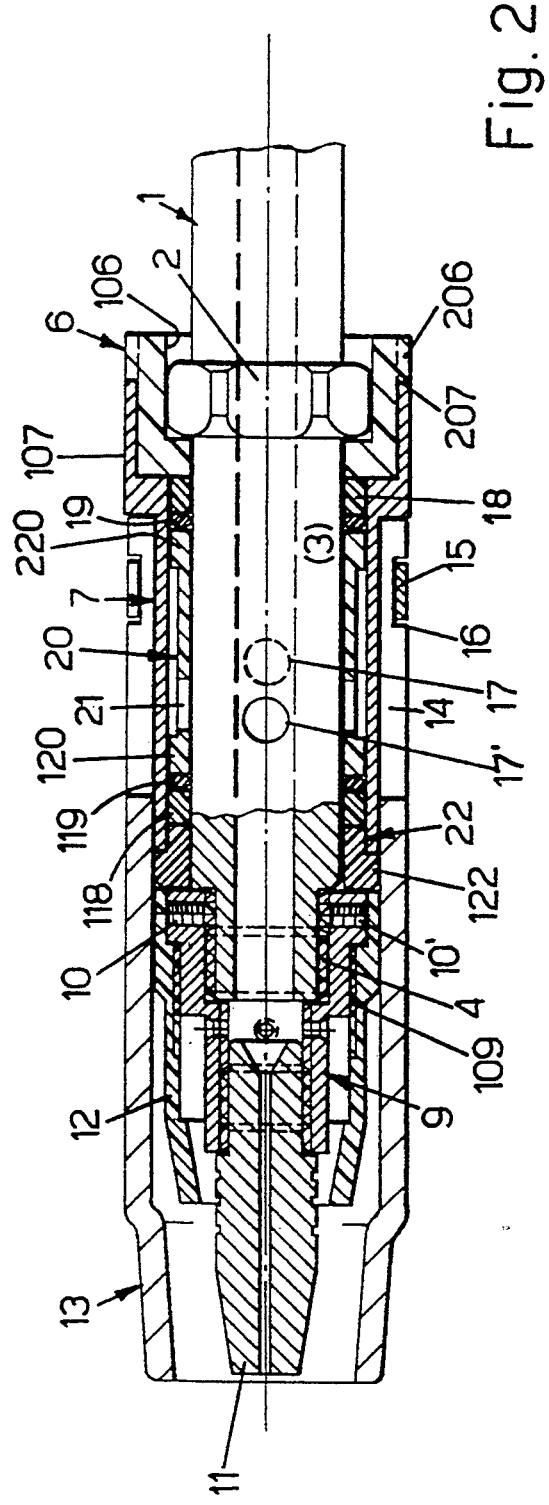
Fig.1
Fig.2

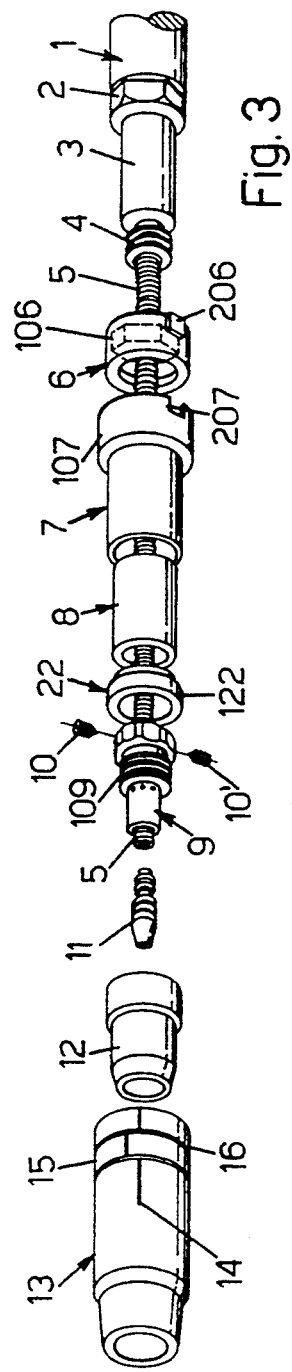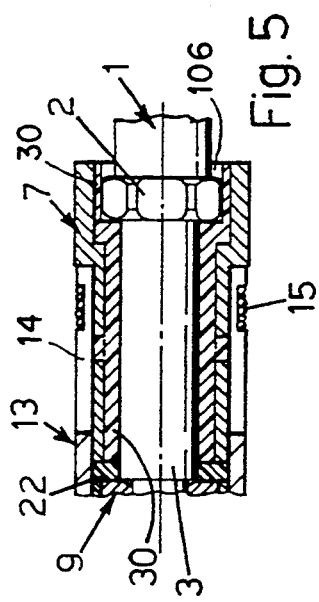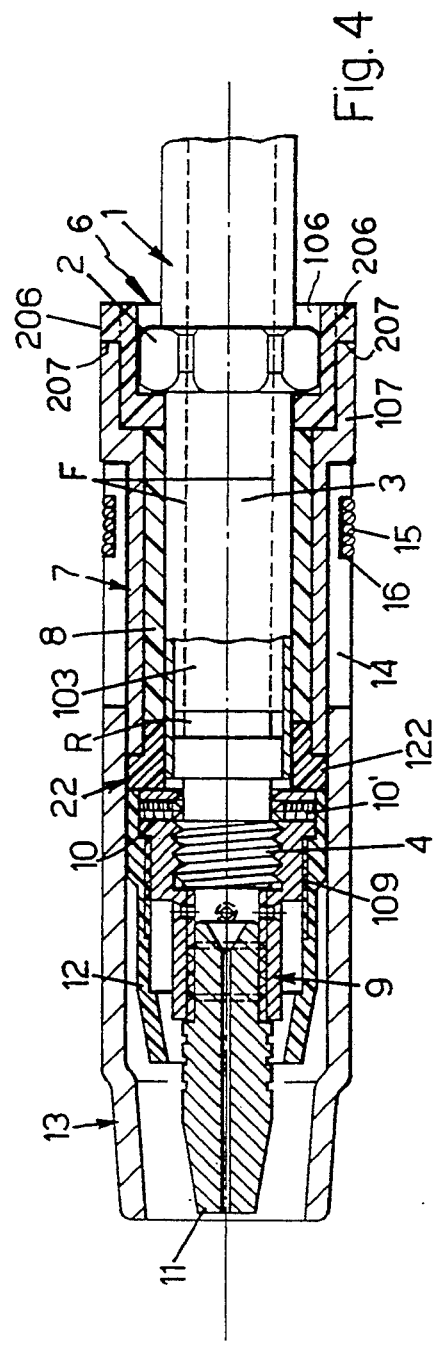

TORCH FOR CONTINUOUS-WIRE ELECTRIC WELDING MACHINES, GAS- OR WATER-COOLED

The invention relates to a torch for continuous-wire electric welding machines, gas- or water-cooled, characterized by a safe and reliable operation and by a rapid, simplified and foolproof assemblage.

The characteristics of the torch of the invention, and the advantages resulting therefrom, will become apparent from the following description made with reference to the Figures of the accompanying two sheets of drawings, wherein:

FIG. 1 is a perspective exploded view showing the various components of the end portion of the welding torch provided with a closed circuit for forced circulation of the cooling water;

FIG. 2 is a longitudinal section view of the end portion of the torch of FIG. 1, in its operative condition;

FIG. 3, is a perspective exploded view showing the various components of the end portion of the welding torch provided with a sealed circuit for forced circulation of the cooling water;

FIG. 4 is a longitudinal section view of the end portion of the torch of FIG. 3, in its operative condition;

FIG. 5 is a section view of a detail of a modified embodiment of the torch of FIG. 4, in a gas-cooled version.

It is to be stated beforehand that in the following description the term "rigid plastics or other suitable material" will be used to mean any material or composite materials, even different from plastics material and/or resins, characterized by good electrically insulating characteristics, by a good resistance to the action of heat and, desirably, by a good thermal conductivity.

With reference first to FIGS. 1 and 2, it is to be noted that the body 1 of the torch terminates with a stepped configuration, decreasing outwardly, which comprises, beginning from the innermost portion of maximum width or cross section; a polygonal collar 2, for example, of hexagonal or other equivalent configuration; an intermediate cylindrical portion 3, of round cross section; a threaded end portion 4. The portions 2-3-4 are made of metal and through the portions there passes axially a flexible sheath 5 which guides the continuous welding electrode to the outlet spout 11, and which is passed through and lapped by the flow of inert gas required for welding.

While maintaining the arrangement mentioned above and, possibly, the dimensioning of the portions 2-3-4, the torch may be constructed as shown by the three embodiments described below: namely, water-cooled, with closed circuit; water-cooled, with sealed circuit; cooled by only the inert gas required for welding.

In the water-cooled torch with closed circuit, as from FIGS. 1 and 2, the cylindrical portion 3 of the torch body is provided with opposite and staggered openings 17-17' for inlet and outlet of cooling water therethrough.

Mounted on the end portion of the torch body there is a cup 6 made of rigid plastics or other suitable material, formed with a seat 106 which is in end-to-end abutment against the collar 2 and embraces the latter with a mating profile so as to be locked thereto. The cup 6 is of cylindrical, round cross section externally, and is provided with one or more integral protrusions 206 projecting radially therefrom for locking purposes.

After mounting the cup 6 on the cylindrical portion 3 of the torch body, the following components are to be mounted:

a first ring 18 of rigid plastics or other suitable material;

a first rubber O-ring 19;

a spacing bush 20 of rigid plastics or other suitable material, provided with suitably-arranged holes 21 which do not obstruct the openings 17-17' for circulation of cooling water, said bush comprising thicker end collars 120-220 havig the same diameter as said ring 18;

a second rubber O-ring 119;

a second ring 118 of rigid plastics or other suitable material.

On the components 18-118-19-119-20-21 there is mounted a preferably metallic bush 7 provided with a collar 107 embracing the cup 6 and whose slots 207 co-operate with the protrusions 206 on said cup, so that it cannot rotate. Bush 7 has an inner diameter which is equal to or slightly larger than the outer diameter of the portions 18-118-120-220.

On the end portion 3 of the torch body there is then mounted a ring 22 of rigid plastics or other suitable material, which partly penetrates the metallic bush 7 and is provided with an abutting collar 122.

Thereafter, by screwing the nozzle 9 onto the threaded end portion 4 of the torch body, the assembly 22-18-118-19-119-20-120-220 is tightened together, with deformation of the rubber rings 19-119 which create a sealed engagement between the parts 3 and 7, closing at the ends the cooling water circulation chamber concerning said parts 3 and 7. The collar 122 of the ring 22 may abut against the bush 7 to avoid any excessive deformation of the rings 19-119.

It is to be understood that the ring 118 may be formed integral with the ring 22 and that the ring 18 may be formed integral with the cup 6.

The torch is completed by the following components:

a bush 12 of rigid plastics or other suitable material, either screwed or closely fitted otherwise on the intermediate threaded or otherwise prepared portion 109 of the nozzle 9 and surrounding in a conventional manner said nozzle and a portion of the spout 11;

a housing 13, usually of metal, which encloses and shields all the components mentioned above, excepted the collar 107 of the bush 7. The housing 13 is snappingly engaged on the bush 7 thanks to an end portion thereof which is rendered elastic by one or more longitudinal, equally-spaced slits 14 and by one or more open steel rings 15 accommodated in an annular recess 16.

Grub-screws 10-10' screwed on the nozzle 9 lock the latter on the end portion 4 and prevent it from unscrewing during the replacement of the spout 11 which is screwed axially on said nozzle 9.

In order to avoid any internal electroerosion effect on the torch body, at least one of the contacting surfaces of the bush 7 and housing 13 may be coated with a plastics material (not shown) or other suitable electrically-insulating material having such features (e.g. thickness, etc.) as to be a good heat-conducting material. Otherwise, the bush 7 may be made of plastics or other suitable material and possibly it may incorporate the end cup 6.

The disadvantages mentioned above may be also overcome by the torch of FIGS. 3 and 4 having a water cooling circuit of the so-called sealed type. The portion 3 of this torch body is not provided with the holes 17-17' shown in FIGS. 1 and 2. More particularly, it is to be noted in FIG. 4 that the inlet and outlet ducts for the cooling water in the portion 3, machined conventionally by longitudinal, opposite milling at F on the inner tube 103 of the torch body will open, at the end of the portion 3, into an annular chamber defined by an annular recess R formed in said tube 103, so that water can pass from one to the other of said ducts, with no outlet outwards of the portion 3 as occurring in the torch of FIGS. 1 and 2.

The torch of FIGS. 3 and 4 is distinguished from that of FIGS. 1 and 2 due to the replacement of the portions 18-19-20-119-118 with a single bush 8 made of rigid plastics or other suitable material, arranged between the portion 3 of the torch body and the bush 7, so as to insulate the latter electrically, also with the aid of the end ring 22 which is also made of plastics or other suitable material. The thickness of the bush 8 is sufficiently limited so that the metallic bush 7 may be as near as possible to internally-cooled portion 3 of the torch body, thus ensuring an effective dissipation of the heat being transferred to the housing 13 during the welding operation.

The torch of FIGS. 3 and 4 not only avoids any electro-erosion problems, as mentioned above in connection with the embodiment of FIGS. 1–2, but it can go on working with no trouble even in default of circulation of the cooling water, because a sufficient cooling action is ensured anyway by the circulation therein of the inert gas required for welding.

The torch of FIGS. 3 and 4 may undergo the following modifications, shown in FIG. 5, for torches cooled by circulation of inert gas required for the continuous welding process. The cup 6 and bush 8 may be replaced by a single and equivalent member 30 of rigid plastics or other suitable material, which engages the bush 7 along its entire length and which preferably is secured in any suitable manner to said metallic bush. The ring 22 of rigid plastics or other suitable material has now a simplified configuration. However, it is to be understood that said ring may be formed integral with the part 30.

As mentioned in the preamble of the present description the torch is constructed with equal arrangement and dimensions for its end portions 2-3-4, regardless of the cooling type being used, and consequently the user of the torch of FIGS. 1 and 2 may be supplied advantageously with either the spare parts 7-8-22 for the torch of FIGS. 3-4 or the spare parts 7-30-22 for the torch of FIG. 5 to replace the parts 18 to 22 of the same torch as from FIGS. 1–2, to enable to continue using it even in case of failure of the cooling water circulating system.

Finally, it is to be understood that, according to a further minor constructional modification, the bush 7 of the torch of FIGS. 3-4-5 may also be made of rigid plastics or other suitable material and may be integral with all the other bushes made of the same material. At least in the region in contact with the housing 13, the new bush made of plastics or other suitable material should be characterized, as to its thickness or other feature, by a good thermal conductivity.

The torch of FIGS. 3-4-5 is complete with the same parts 12 to 16 disclosed above in connection with the torch of FIGS. 1 and 2.

I claim:

1. A torch for continuous-wire electric welding machines, either gas- or water-cooled, comprising:
   a torch body terminating in a stepped outwardly-decreasing configuration which, beginning from the innermost maximum cross-section portion, comprises;
   a collar of polygonal shape,
   a cylindrical portion of round cross section, and
   a threaded end portion;
   a gas-diffusing nozzle screwed onto said threaded end portion of said torch body;
   a wire-guiding outlet spout screwed to said gas-diffusing nozzle;
   a protecting bush firmly mounted on said nozzle for protecting said nozzle and a portion of said spout; and
   surrounding portions surrounding said intermediate and said cylindrical portion of said torch body, said cylindrical portion being cooled in any suitable manner by at least one of forced circulation of water and the circulation of gas required for welding, wherein an outer one of said surrounding portions, composed of a material which is a good thermal conductor and wear-resistant, being coupled at one end to said collar with the interposition of an insert and having frictionally fitted thereon an end portion, constructed as an elastic clamp, of a housing which encloses and protects said nozzle and said spout, heat induced by welding operation into said housing being rapidly dissipated from said outer one.

2. A torch according to claim 1, further comprising:
   a cup which encloses an end portion of said cylindrical portion of said torch body, said cup being provided at an end with a seat for coupling said cup with said collar of said torch body, and said cup being of round section externally and provided with one or more integral lateral protrusions acting as locking keys;
   said outer one surrounding, with clearance, said cylindrical portion of said torch body and which is provided at one end with a collar surrounding said cup and coupled with said cup by means of suitable slots for cooperating with said locking keys on said cup; and
   surrounding portions other than said outer one including a bush surrounding said cylindrical portion of said torch body and being surrounded by said outer one, and a ring receiving an axial load of said nozzle, said ring surrounding said end portion of said cylindrical portion of said torch body, in end-to-end abutment against an adjacent end of said outer one and partially penetrating into said outer one to fill a corresponding space which is not occupied by said bush.

3. A torch according to claim 2, wherein said cup, said bush and said ring are made out of a single body of rigid plastics and are surrounded externally by said outer one, said outer one being made of metal and being secured to said body.

4. A torch according to claim 2, wherein said cup, said bush, said ring and said outer one are structurally integrated into a single bush made of material having good electrical insulation characteristics, good resistance to heat and good thermal conductivity.

5. A torch according to claim 1, wherein said torch is water cooled and further comprises:
   staggered openings for inlet and outlet of water positioned along said cylindrical portion;

a cup surrounding an end of said cylindrical portion of said torch body, said cup being provided at an end with a seat for coupling said cup with said collar of said torch body, an external side of said cup being round and provided with one or more lateral protruding extensions acting as locking keys;

said outer one surrounding said cylindrical portion of the torch body with a clearance, said outer one being provided at one end with a collar surrounding said cup and having suitable slots for coupling with said locking keys on said cup; and said surrounding portion other than said outer one comprising, beginning from said cup;
- a first ring of rigid plastics;
- a first rubber O-ring;
- a spacing or slotted bush, with protruding collars at its ends;
- a second rubber O-ring;
- a second ring of rigid plastics all being surrounded by said outer one; and
- an end ring which penetrates the front end of said outer one and comprises a collar whose front end is acted upon by said nozzle wherein said slotted bush will press said first and second O-rings to engage sealingly with said cylindrical portion of said torch body, and with said outer one, so as to sealingly close the ends of a circulation chamber formed between said cylindrical portion, for the cooling water said outer one and said slotted bush.

6. A torch according to claim 5, wherein said first and second rings are acted upon by said first and second rubber O-rings and are integral, at one side, with said cup and, at the other side, with said end ring.

7. A torch according to claim 5, wherein said outer one is integral with said cup.

8. A torch according to claim 5, wherein said outer one comprises a bush of rigid plastics.

9. A torch according to claim 5, wherein said surrounding portions other than said outer one are interchangeable with a bush surrounding said cylindrical portion and being surrounded by said outer one, and a ring receiving an axial load of said nozzle, said ring surrounding said end portion of said cylindrical portion, in end-to-end abutment against an adjacent end of said outer one and partially penetrating into said outer one to fill a corresponding space which is not occupied by said bush.

10. A torch according to claim 9, wherein said cup, said bush and said ring are made out of a single body of rigid plastics and are surrounded externally by said outer one, said outer one being made of metal and secured to said body.

11. A torch according to claim 1, wherein dimensions of said portions of said torch body are the same.

* * * * *